(12) United States Patent
Caner

(10) Patent No.: US 8,990,378 B2
(45) Date of Patent: Mar. 24, 2015

(54) SYSTEM AND METHOD FOR COLLECTION AND ANALYSIS OF SERVER LOG FILES

(75) Inventor: Ilan Caner, Givataim (IL)

(73) Assignee: Interwise Ltd., Ben-Gurion Airport (IL)

( * ) Notice: Subject to any disclaimer, the term of this patent is extended or adjusted under 35 U.S.C. 154(b) by 1642 days.

(21) Appl. No.: 11/773,606

(22) Filed: Jul. 5, 2007

(65) Prior Publication Data

US 2009/0013007 A1    Jan. 8, 2009

(51) Int. Cl.
 G06F 15/16   (2006.01)
 H04L 12/24   (2006.01)
 H04L 12/58   (2006.01)
 H04L 12/26   (2006.01)

(52) U.S. Cl.
 CPC ............ *H04L 41/0631* (2013.01); *H04L 51/00* (2013.01); *H04L 43/06* (2013.01); *H04L 43/12* (2013.01); *H04L 43/04* (2013.01); *H04L 41/069* (2013.01)
 USPC ........................................................ 709/224

(58) Field of Classification Search
 CPC ......... H04L 43/00; H04L 43/04; H04L 43/06; H04L 43/12; H04L 41/0631; H04L 41/069; H04L 51/00
 USPC ........................................................ 709/224
 See application file for complete search history.

(56) References Cited

U.S. PATENT DOCUMENTS

| | | | | |
|---|---|---|---|---|
| 6,018,619 A * | 1/2000 | Allard et al. | ................... | 709/224 |
| 6,092,087 A * | 7/2000 | Mastors | ................................. | 1/1 |
| 6,202,158 B1 * | 3/2001 | Urano et al. | .................... | 726/22 |
| 6,317,787 B1 * | 11/2001 | Boyd et al. | ..................... | 709/224 |
| 6,516,341 B2 * | 2/2003 | Shaw et al. | .................... | 709/206 |
| 6,658,434 B1 * | 12/2003 | Watanabe et al. | ...................... | 1/1 |
| 6,721,749 B1 * | 4/2004 | Najm et al. | ............... | 1/1 |
| 6,789,115 B1 * | 9/2004 | Singer et al. | ................... | 709/224 |
| 7,043,547 B2 * | 5/2006 | Cobb et al. | ..................... | 709/224 |
| 7,562,134 B1 * | 7/2009 | Fingerhut et al. | .............. | 709/224 |
| 7,882,215 B2 * | 2/2011 | DeLuca et al. | ................ | 709/224 |
| 2003/0217292 A1 * | 11/2003 | Steiger et al. | .................. | 713/201 |
| 2003/0220998 A1 * | 11/2003 | Jennings et al. | .............. | 709/224 |
| 2004/0030778 A1 * | 2/2004 | Kronenberg et al. | .......... | 709/224 |
| 2006/0036670 A1 * | 2/2006 | Musman | ........................ | 709/202 |
| 2006/0075092 A1 * | 4/2006 | Kidokoro | ....................... | 709/224 |
| 2006/0161816 A1 * | 7/2006 | Gula et al. | ...................... | 714/39 |
| 2007/0016672 A1 * | 1/2007 | Wilson et al. | .................. | 709/224 |
| 2007/0233756 A1 * | 10/2007 | D'Souza et al. | .............. | 707/204 |
| 2008/0275951 A1 * | 11/2008 | Hind et al. | ..................... | 709/204 |

* cited by examiner

*Primary Examiner* — Aaron Strange
(74) *Attorney, Agent, or Firm* — Greenblum & Bernstein, P.L.C.

(57) ABSTRACT

A method of handling log files in a network with multiple servers, including, installing an agent application on each server in the network, collecting log files on each server by the agent application, defining a uniform format for providing the log files to a central server, transforming the log files to the defined uniform format, transmitting the transformed log files to a central server, storing the log files in an archive by the central server, analyzing the log files received by the central server, producing reports responsive to the analysis of the log files.

16 Claims, 3 Drawing Sheets

SYSTEM AND METHOD FOR COLLECTION AND ANALYSIS OF SERVER LOG FILES

FIELD OF THE INVENTION

The present invention relates generally to the collection and analysis of log files from multiple servers in a network.

BACKGROUND OF THE INVENTION

Computer network servers typically create log files which track various activities and applications on the server, for example events that occurred when booting the server, recording client access to the server, and backing up files on the server. Typically if a problem occurs an administrator can access the log files and retrieve information, which can be analyzed to determine the cause of the problem, so that it can be dealt with.

In an enterprise network, the organization typically has many servers distributed in various geographical locations. Each server may create multiple log files for different types of processes and each log may be in a different form.

The organization may have an administrative body that deals with maintaining the network. Generally the common method of utilizing the log files from a remote server is one of the following:

1. If a problem occurs an administrator accesses the remote server and reviews the log files to determine the source of the problem.
2. If a problem occurs a local user runs a program to collect the log files and transmit them to the administrator.
3. The remote server redirects the log file, so that the log files are physically written to the administrator's file system. If a problem occurs the administrator can view the log files locally.
4. The remote server analyzes the local log files and only transmits details related to the problem (e.g. specific lines from the log files) or a message explaining the problem to the administrator based on the information in the log files.

These methods provide answers to specific problems however they lack scalability. If there are multiple servers, each server needs to be handled individually. In some cases not all of the servers use the same operating system. Additionally, the methods currently used in the art do not provide an automatic solution that can warn about future problems and provide advice for dealing with current problems in an enterprise network with many servers.

SUMMARY OF THE INVENTION

An aspect of the invention, relates to a system and method for handling log files from multiple servers in an enterprise network.

In an exemplary embodiment of the invention, an agent application is installed on each server in the enterprise network to handle the log files on the server. This enhances scalability of the network that can be handled by a central log server since preparation of the log files is dealt by each server and does not burden the central log server. In an exemplary embodiment of the invention, at pre-selected times the agent application processes the log files created by the hosting server to produce a predefined uniform log file or set of uniform log files for transmission to the central log server. Optionally, the agent application also creates a uniform analysis report to provide warnings regarding the occurrence of an event and/or statistical data resulting from the log files on the hosting server. In an exemplary embodiment of the invention, the agent compresses the information and transmits it to the central log server with or without the original log files.

In an exemplary embodiment of the invention, the central log server receives the log files from each server and stores it in a log database. The central log server reviews the information in the received uniform log files and produces warnings regarding servers that need maintenance. Optionally, the central log server may perform further analysis of the information on its own or in comparison to other servers. In an exemplary embodiment of the invention, the central log server provides reports comparing the performance of various servers and/or information regarding the status of the enterprise network, for example the number of user on a specific day, the available storage space in the entire network or the average disk consumption per day on a specific server or specific group of servers.

There is thus provided according to an exemplary embodiment of the invention, a method of handling log files in a network with multiple servers, including, installing an agent application on each server in the network, collecting log files on each server by the agent application, defining a uniform format for providing the log files to a central server, transforming the log files to the defined uniform format, transmitting the transformed log files to a central server, storing the transformed log files in an archive by the central server, analyzing the transformed log files received by the central server, producing reports responsive to the analysis of the transformed log files. Optionally, the log files are collected periodically. Alternatively or additionally, the log files are collected at pre-defined times. Further alternatively or additionally, the log files are collected as they are created.

In an exemplary embodiment of the invention, the transmitted log files are compressed before transmission. Optionally, the original log files are transmitted with the transformed log files to the central server. In an exemplary embodiment of the invention, the defined uniform format includes different formats for different types of log files. Optionally, the reports warn about problems in a specific server. In an exemplary embodiment of the invention, the reports provide comparative information regarding multiple servers. Optionally, the reports provide statistical information regarding multiple servers in the network. In an exemplary embodiment of the invention, the agent application produces log files regarding the activity of the server it is installed on. Optionally, the central server keeps copies of the files it receives for a length of time independent of the time the files are kept by the server producing the files.

There is thus further provided according to an exemplary embodiment of the invention, a system for handling log files in a network with multiple servers, including, a central server to receive log files from the multiple servers, an agent application to install on each server, wherein the agent application is adapted to collect log files on each server, transform them to a predefined form and transmit them to the central server; and wherein the central server is adapted to receive the log files from multiple servers, analyze the log files and provide reports regarding the content of the log files received. Optionally, the agent application is adapted to produce log files regarding activities of the server. In an exemplary embodiment of the invention, the agent application is adapted to transmit the log files in their original form in addition to the transformed form.

BRIEF DESCRIPTION OF THE DRAWINGS

The present invention will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION

Figure 1:
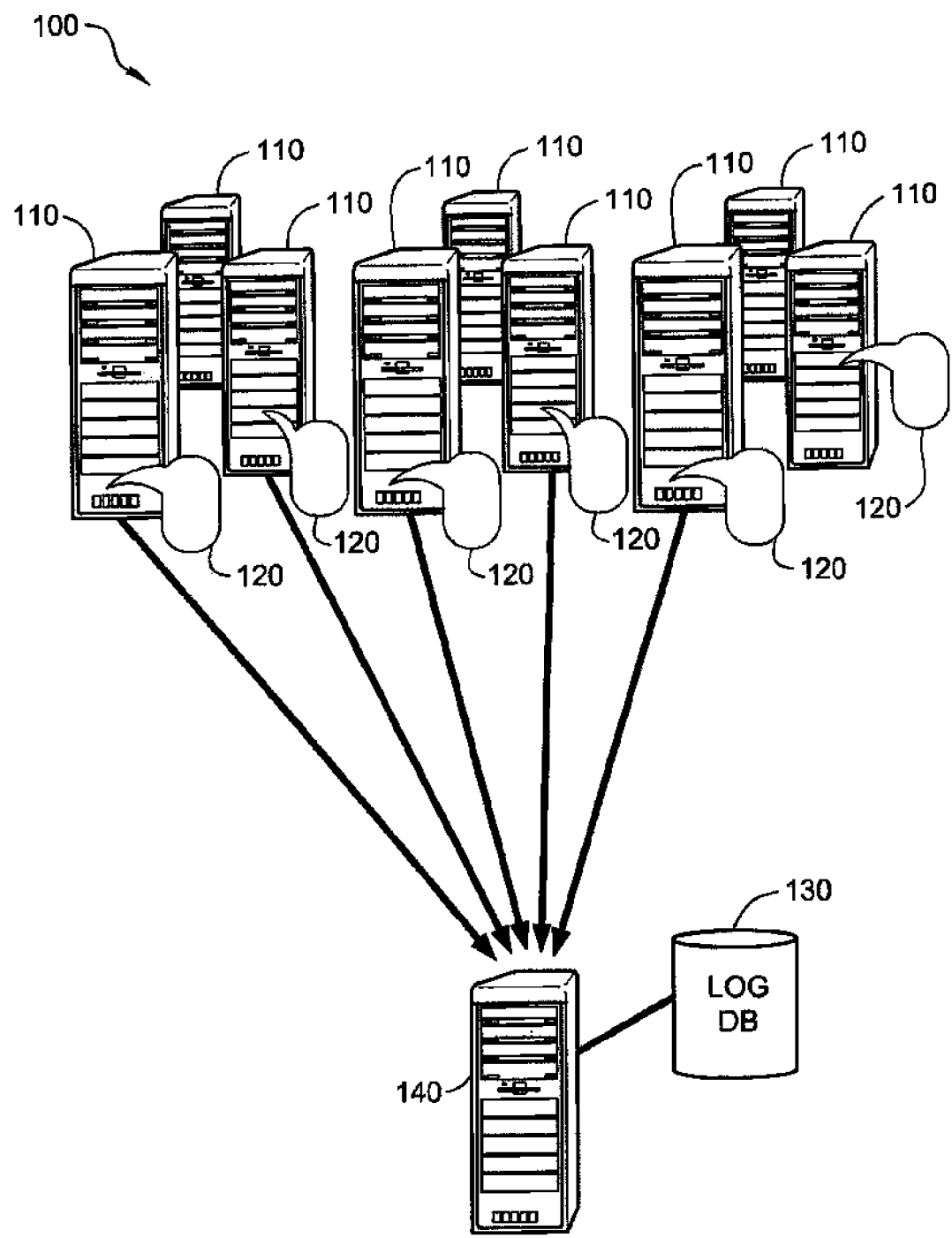
FIG. 1 is a schematic illustration of an enterprise network with a central server that receives log file information from one or more network servers, according to an exemplary embodiment of the invention.

FIG. 1 is a schematic illustration of an enterprise network 100 with a central server 140 that receives log file information from one or more network servers 110, according to an exemplary embodiment of the invention. In an exemplary embodiment of the invention, each server 110 may use a different operating system, for example Novell Netware, Unix, Microsoft server or any other server software or even any other operating system (e.g. Windows 98 on a computer serving as a server for a peer to peer network). Optionally, server 110 may even be a standalone workstation that runs programs that creates one or more log files, for example a tape backup log or a boot log. In an exemplary embodiment of the invention, an agent application 120 is installed on each server 110 to process the log files created on server 110 and transmit them to central server 140.

In some embodiments of the invention central server 140 is a single computer. Alternatively, central server 140 can be a group of computers to handle a large number of servers 110, and to reduce or eliminate down time of the central server 140. Optionally, load balancers or other devices can be used to regulate the transmissions for central server 140 if more than one server is used. In some embodiments of the invention, central server 140 comprises a log database 130, which include a large amount of storage space (e.g. a storage area network (SAN), a disk array or raid system) for storing all the log file information.

Figure 2:
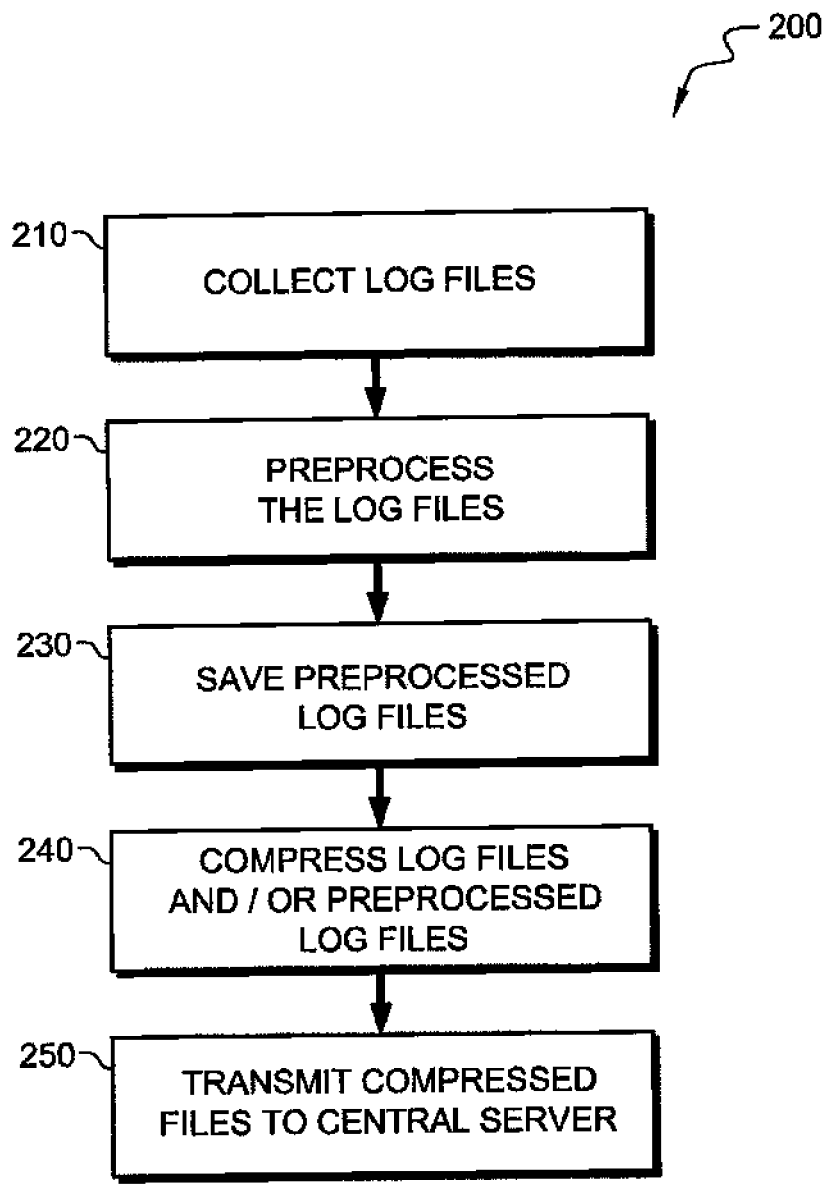
FIG. 2 is a flow diagram of a method of processing log files at a remote server by an agent application, according to an exemplary embodiment of the invention.

FIG. 2 is a flow diagram of a method (200) of processing log files at remote server 110 by agent application 120, according to an exemplary embodiment of the invention. In an exemplary embodiment of the invention, agent application 120 is programmed to collect (210) the log files created on the server 110 it is installed on and process them. Optionally, the log files are collected at a pre-selected time (e.g. at 3 in the morning) or periodically after a certain number of hours (e.g. every 12 hours). In some embodiments of the invention, the collection is done in real-time during creation of the log files.

In an exemplary embodiment of the invention, the collected log files are preprocessed (220) by agent application 120 to prepare log files in a pre-defined uniform format, to emphasize items that need care or to add to the log files information that is not included in the original format of the log file, for example information that is available at server 110 and of interest for later analysis of the log file on central server 140. In an exemplary embodiment of the invention, agent application 120 is programmed for each server 110 to recognize the data fields of the log files produced on the server 110 and know which fields of the uniform format correspond to them. In some embodiments of the invention, more than one type of uniform format may be defined, for example to handle different types of log files such as tape backup log files and client user access log files.

Optionally, pre-processing at server 110 by agent application 120 increases scalability of enterprise network 100, since each server 110 provide the information in a form that will minimize handling by central server 140. Optionally, server 110 saves (230) the pre-processed log files, then server 110 compresses (240) the pre-processed log files and/or the original log files to reduce the size of the information that needs to be transmitted to central server 140. Optionally, by compressing the information the transmission consumes less bandwidth than would be required if the log files were redirected to be written on central server 140. In an exemplary embodiment of the invention, the compressed files are then transmitted (250) to central server 140. In some embodiments of the invention, the original log files are also provided to central server 140 to be used to resolve problems, if questions arise regarding the content of the pre-processed log files.

Figure 3:
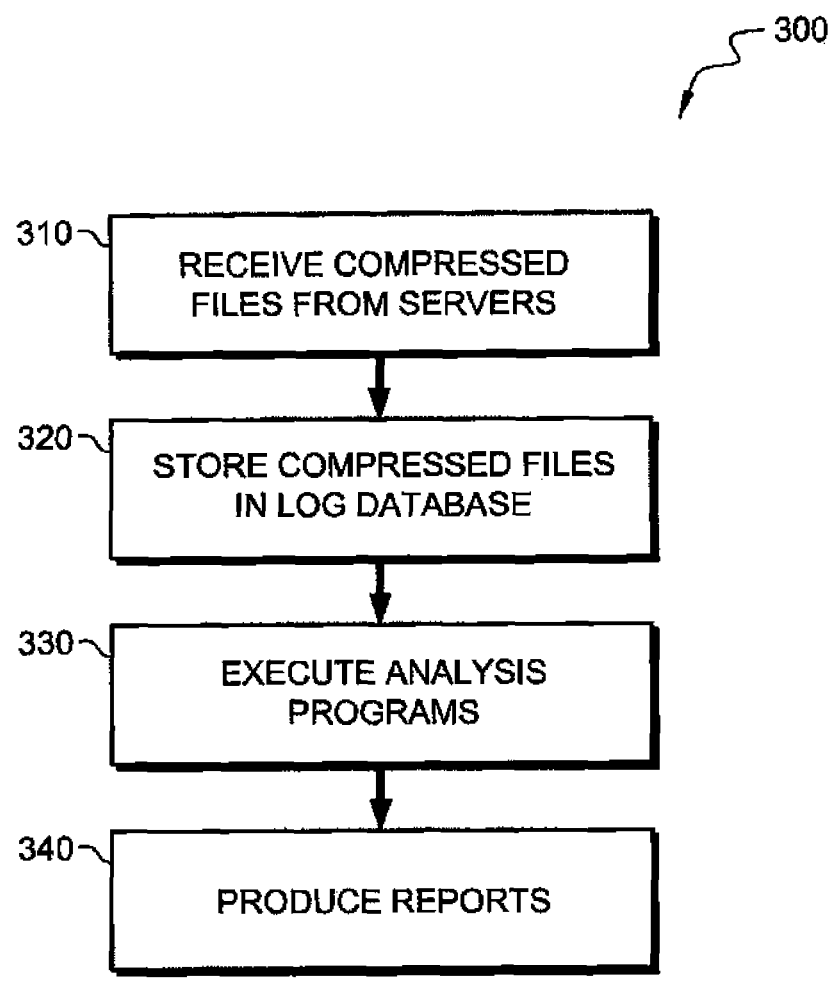
FIG. 3 is a flow diagram of a method of processing log files at a central server, according to an exemplary embodiment of the invention.

FIG. 3 is a flow diagram of a method (300) of processing log files at central server 140, according to an exemplary embodiment of the invention. In an exemplary embodiment of the invention, central server 140 receives (310) the compressed files from servers 110. Optionally, central server 140 stores (320) the compressed files in log database 130 for future use. In an exemplary embodiment of the invention, central server 140 keeps the log files for a time that is independent of the time that the files are kept by the server producing the log files. Optionally, the log files can be erased at the server creating the log files to release disk/storage space, whereas central server 140 keeps a copy in log database 130 for future lookup and analysis. In an exemplary embodiment of the invention, central server 140 extracts selected log files from log database 130, for example the log files in uniform format. Then central server 140 executes (330) various analysis programs on the information. Optionally, the analysis is used to produce (340) reports regarding upcoming problems or compare between servers. Following is a list of some exemplary reports which may be produced:

1. The average disk consumption per day for each server.
2. The average number of users that log into each server each day.
3. The available disk space on a specific server and/or in the entire network.
4. Servers that need to be visited by a technician/administrator for performing maintenance.

In some embodiments of the invention, agent 120 provides log files regarding various activities of server 110, for example for a server that does not produce any log files on its own or in addition to log files produced by the server. Optionally, agent 120 can be used to monitor various activities performed by one or more of servers 110, for example the identity of client users that log into server 110 or to record IP addresses to which packets are transmitted and/or from which packets are received by server 110. Optionally, agent 120 records the activity in a log file and central server 140 can use the information to form additional reports based on the information provided by agents 120. Optionally, the above collected information can be used to produce other reports, for example:

1. Trend analysis, for example usage trends and network bandwidth trends.
2. Resource usage reports, for example the number of users on the system as a function of time.

In some embodiments of the invention, the contents of database 130 can be used in data mining applications, for example for on line analytical processing (OLAP).

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the invention. Further combinations of the above features are also considered to be within the scope of some embodiments of the invention.

It will be appreciated by persons skilled in the art that the present invention is not limited to what has been particularly shown and described hereinabove. Rather the scope of the present invention is defined only by the claims, which follow.

The invention claimed is:

1. A method of handling log files in a computer network having a plurality of servers, comprising:
   installing an agent application on each of the plurality of servers in the computer network;
   collecting log files generated at each of the plurality of servers by the agent application;
   defining a uniform format for sending the log files to a central server apparatus;
   transforming the log files to the defined uniform format;
   compressing transformed log files that emphasize events that require attention;
   transmitting the log files and compressed, transformed log files that emphasize the events that require attention to the central server apparatus;
   erasing the log files from each of the plurality of servers;
   storing the transformed log files in an archive by the central server apparatus;
   analyzing the transformed log files received by the central server apparatus; and
   producing reports responsive to analyzing the transformed log file,
   wherein the defined uniform format is one of a plurality of distinct formats that each correspond to distinct types of log files.

2. The method according to claim 1, wherein the log files are collected periodically.

3. The method according to claim 1, wherein the log files are collected at pre-defined times.

4. The method according to claim 1, wherein the log files are collected upon creation.

5. The method according to claim 1, wherein the log files are compressed before transmission.

6. The method according to claim 1, wherein the reports include warning information about problems in at least one specified server of the plurality of servers.

7. The method according to claim 1, wherein the reports include comparative information regarding the plurality of servers.

8. The method according to claim 1, wherein the reports include statistical information regarding the plurality of servers in the computer network.

9. The method according to claim 1,
   wherein the agent application installed on each server produces the log files, and
   wherein the log files relate to at least one activity of the servers upon which the agent application is installed.

10. The method according to claim 1,
    wherein the central server apparatus retains copies of at least one of the transformed log files and the log files for a length of time,
    wherein the length of time is independent of a time the at least one of the transformed log files and the log files are retained by a server producing the at least one of the transformed log files and the log files.

11. The method according to claim 1, wherein the log files are tape backup log files.

12. The method according to claim 1, further comprising:
    adding information to the log files during transforming the log files to the defined uniform format.

13. A system for handling log files in a computer network having a plurality of servers, comprising:
    a central server apparatus that receives log files,
    wherein an agent application is installed on the plurality of servers;
    wherein the central server apparatus receives log files generated at each of the plurality of servers in a defined uniform format;
    wherein the agent application installed on each of the plurality of servers collects log files generated at each of the plurality of servers, transforms each of the log files to the defined uniform format, compresses transformed log files that emphasize events that require attention, and transmits each of the log files and the compressed, transformed log files that emphasize the events that require attention to the central server apparatus,
    wherein the log files are erased from each of the plurality of servers,
    wherein the central server apparatus receives the log files from each of the plurality of servers, analyzes the log files and provides reports regarding content of the log files, and
    wherein the defined uniform format is one of a plurality of distinct formats that each correspond to distinct types of log files.

14. The system according to claim 13,
    wherein the agent application installed on each server produces the log files, and
    wherein the log files relate to at least one activity of the servers upon which the agent application is installed.

15. The system according to claim 13, wherein the log files are tape backup log files.

16. The system of claim 13,
    wherein additional information is added to the log files during the transforming the log files at each of the plurality of servers.

* * * * *